United States Patent

[11] 3,614,461

| [72] | Inventors | Gordon W. Speer<br>Peterborough, Ontario, Canada;<br>Dennis F. Williamson, Media, Pa. |
|---|---|---|
| [21] | Appl. No. | 7,546 |
| [22] | Filed | Feb. 2, 1970 |
| [45] | Patented | Oct. 19, 1971 |
| [73] | Assignee | Canadian General Electric Limited<br>Toronto, Ontario, Canada |
| [32] | Priority | Aug. 11, 1969 |
| [33] | | Canada |
| [31] | | 59141 |

[54] CIRCUIT FOR KEEPING THE FREQUENCY OF AN INVERTER SYNCHRONIZED WITH THE FREQUENCY OF ANOTHER SOURCE
8 Claims, 9 Drawing Figs.

[52] U.S. Cl. .................................................... 307/64,
307/66, 307/87, 321/4
[51] Int. Cl. .................................................... H02j 9/00,
H02m 5/28
[50] Field of Search ............................. 307/45, 46,
64, 66, 80, 87; 324/83 A, 87; 321/4

[56] References Cited
UNITED STATES PATENTS

| 3,337,743 | 8/1967 | Rolfes .......................... | 307/64 X |
|---|---|---|---|
| 3,348,060 | 10/1967 | Jamieson ...................... | 307/66 |

FOREIGN PATENTS

| 846,545 | 8/1960 | Great Britain ................ | 324/87 |

Primary Examiner—William H. Beha, Jr.
Attorneys—J. Wesley Haubner, Albert S. Richardson, Jr., Frank L. Neuhauser, Oscar B. Waddell and Joseph B. Forman ABSTRACT: In an uninterruptible power supply comprising a normal source of alternating voltage, a rectifier/battery charger, a battery, and a static inverter, the inverter is kept in synchronism with the normal source by controlling its frequency in accordance with an error signal which is representative in magnitude and polarity of any deviation in phase between the output voltage of the inverter and the voltage of the normal source.

INVENTORS:
DENNIS F. WILLIAMSON,
GORDON W. SPEER,
BY
Albert S. Richardson Jr
ATTORNEY PATENTED OCT 19 1971 3,614,461
SHEET 2 OF 2
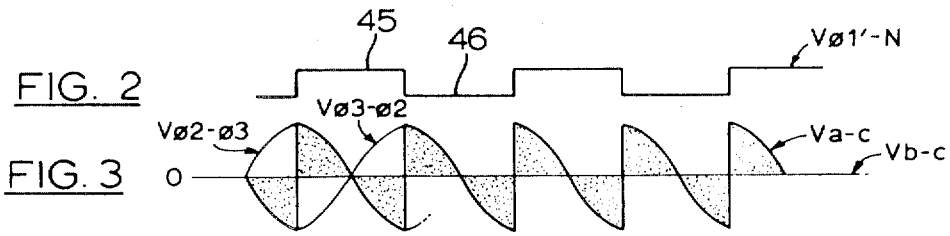
FIG. 2
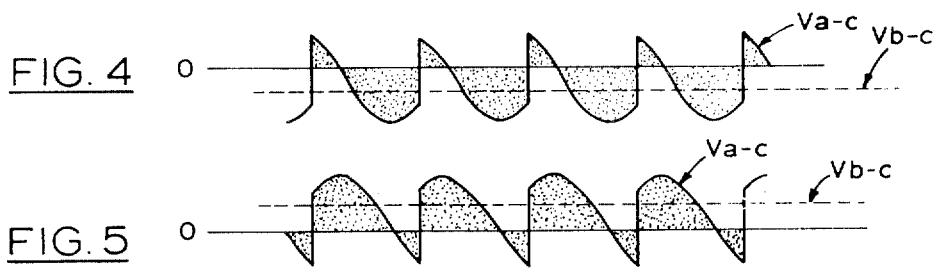
FIG. 3
FIG. 4
FIG. 5
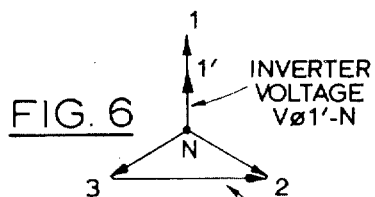
FIG. 6
VOLTAGE VECTORS Vø1'-N AND Vø2-ø3 ARE 90° APART. THIS PRODUCES A ZERO OUTPUT SIGNAL.
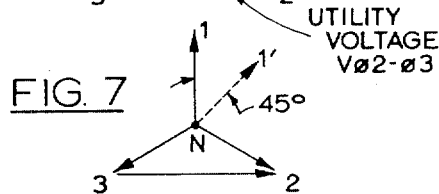
FIG. 7
VOLTAGE VECTORS Vø1'-N AND Vø2-ø3 ARE 45° APART. THIS PRODUCES A MINUS OUTPUT SIGNAL.
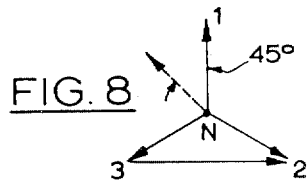
FIG. 8
VOLTAGE VECTORS Vø1'-N AND Vø2-ø3 ARE 135° APART. THIS PRODUCES A PLUS OUTPUT SIGNAL.
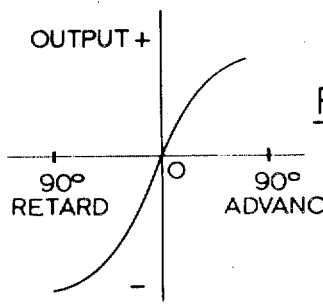
FIG. 9
INVENTORS:
DENNIS F. WILLIAMSON,
BY  GORDON W. SPEER,
Albert S. Richardson Jr.
ATTORNEY 3,614,461

1

CIRCUIT FOR KEEPING THE FREQUENCY OF AN INVERTER SYNCHRONIZED WITH THE FREQUENCY OF ANOTHER SOURCE

This invention relates to a circuit for keeping the frequency of an inverter synchronized with the frequency of another source.

Some power consuming installations, e.g., computers, airports, radar installations, and navigational aids require an uninterrupted supply of alternating current even during brief interruptions on the power system. In some of these installations, the entire load is supplied with alternating current from the inverter by first rectifying the alternating current from the system and then converting it back into alternating current. The installation comprises a rectifier for converting alternating current from the system into direct current, an inverter for converting the direct current back into alternating current for application to the load and a storage battery as a standby source of power. By connecting the storage battery between the rectifier and the inverter through a static switch, the inverter simply draws power from the battery in the event of an interruption on the power system. Moreover, to avoid a power interruption at the load in the event of an inverter failure, the overall circuit includes some means for connecting the load directly to the power system. Since this must be done very quickly, it important that the frequency of the inverter remain in synchronism with the frequency of the power system.

This invention provides a circuit which continuously senses the difference in phase between the voltages of a power system and a load and produces an inverter control signal representing this phase difference. The control signal keeps the frequency of the inverter in synchronism with the frequency of the system.

An embodiment of the invention will now be described in detail with reference to the accompanying drawings, in which:

FIGS. 2 to 5 are wave forms of signals appearing in the circuit;

FIGS. 6 to 8 are vector diagrams of the alternating currents in the circuit; and FIG. 9 is graph of the output signal from the synchronizing circuit.

Figure 1:
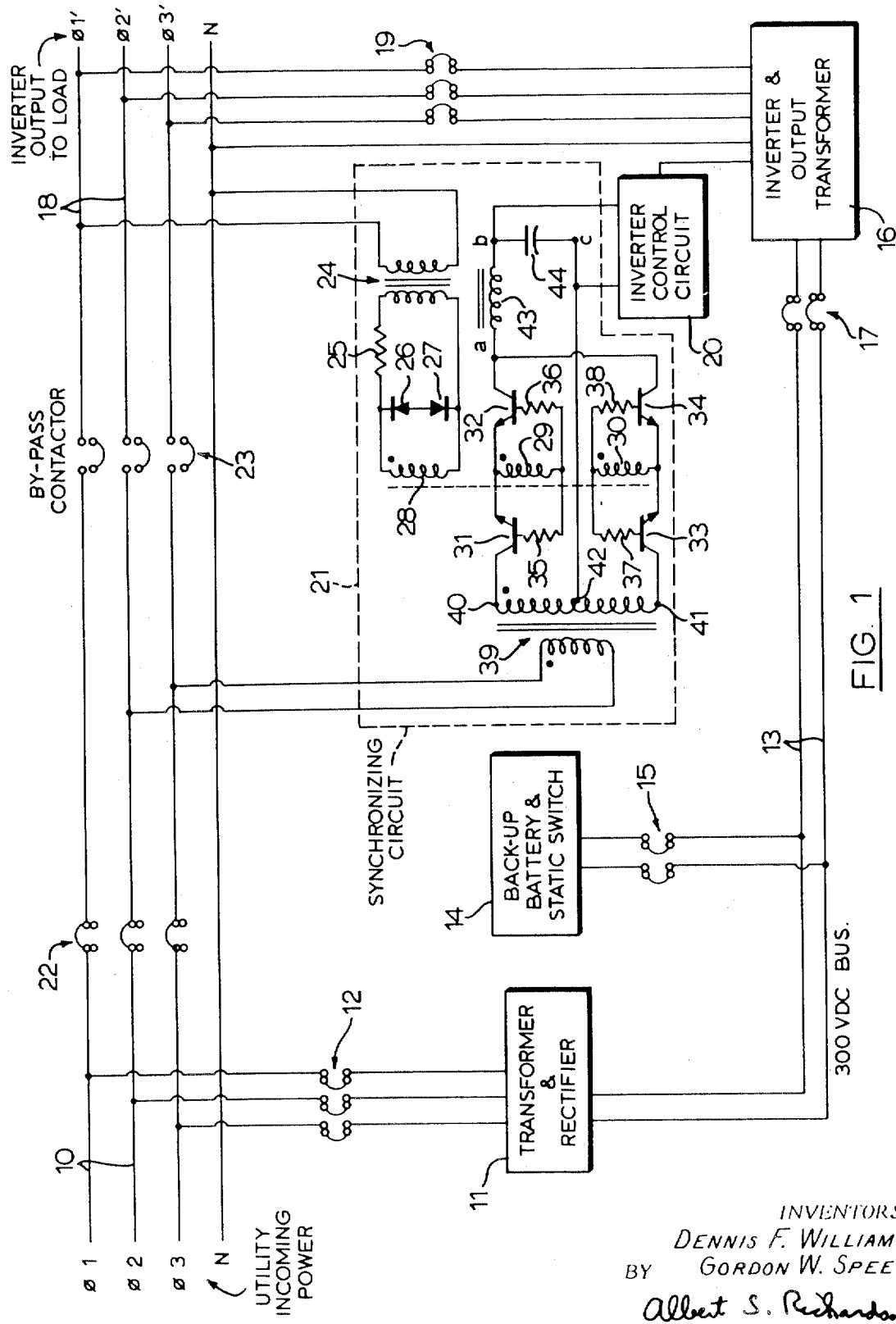
FIG. 1 is a circuit diagram showing the overall circuit in block form and the synchronizing circuit in detail.

In FIG. 1 there is shown a power supply consisting of essentially the following: feeder lines 10 from a three-phase, 60 cycle power system; a transformer-rectifier 11 having its input side connected to the feeder lines through a circuit breaker 12 and its output side to DC bus bars 13; a backup storage battery and static switch 14 connected to the bus bars through a circuit breaker 15; an inverter 16 having its input side connected to the bus bars through a circuit breaker 17 and its output side to load lines 18 through a circuit breaker 19; an inverter control circuit 20; a synchronizing circuit 21; a bypass circuit breaker 22; and a bypass contactor 23 having normally open contacts which when closed connect the load lines directly to the feeder lines. Rectifier 11 is supplied with three-phase, alternating current power from the feeder lines 10, and in turn feeds direct current power into bus bars 13. Inverter 16 then converts this direct current back into alternating current of the same voltage, frequency and phase as that of the incoming power and feeds it into load lines 18. If there is an interruption of power to the incoming feeders, the backup battery 14 is automatically switched on to the DC bus bars in a fraction of a cycle by means of a static switch so that the battery now supplies the inverter with direct current until the power is restored on the incoming feeders. During this time the inverter continues to supply the load with alternating current with no loss of power. Circuit breakers 12, 15, 17, 19 and 22 are normally closed and are employed to protect the various components of the power supply.

The power supply is designed so that the load can be connected directly to the incoming feeder lines by closing the normally open contacts 23 of the bypass contactor in the event of faulty operation of the rectifier-inverter installation, in which case breaker 19 will disconnect the inverter from the load. This switchover is done automatically in a cycle or two in response to a signal representing abnormal inverter operation. However, in order to make the switchover in this short a time it is necessary to keep the frequency of the inverter in synchronism with the frequency of the AC supply, that is, the frequency of the alternating current in load lines 18 must be in synchronism with the frequency of the alternating current in feeder lines 10. Synchronizing circuit 21 exercises a modifying control over the inverter so as to keep its frequency at the proper value. This is done through inverter control 20.

The synchronizing circuit will now be described with reference to FIG. 1. The output voltage from the inverter, i.e., the voltage across phase one and the neutral of lines 18, is stepped down in transformer 24 and converted to a square wave voltage of constant amplitude as illustrated in FIG. 2 by means of the secondary circuit including resistor 25 and the two back-to-back zener diodes 26 and 27. This square wave voltage serves as a reference signal which energizes the primary of a transformer 28 which has two identical secondaries 29 and 30. One terminal of secondary 29 is connected through resistors 35 and 36 to the bases of two NPN transistors 31 and 32 respectively and the other secondary terminal to an interconnection of the emitters of the two transistors. One terminal of the secondary 30 is connected through resistors 37 and 38 to the bases of another pair of transistors 33 and 34 respectively and the other secondary terminal to an interconnection of the emitters of this second pair of transistors. Secondaries 29 and 30 are connected to the pairs of transistors 31, 32 and 33, 34 in an opposite polarity sense so that the transistor pairs are gated on alternately by the positive and negative half cycles respectively of the square wave output of the transformer. That is, transistors 31, 32 are gated on while 33, 34 are off and vice versa. When transistor pair 31, 32 are gated on by a base to emitter current flow (pair 33, 34 are off and like an open switch) they will conduct in either direction if there is an input signal (voltage) available at terminal 40 of a transformer 39 which has its primary connected to phases two and three of feeder 10. Whenever there is a voltage of either polarity at terminal 40, current will pass from this terminal to the center tap 42 of the transformer secondary by way of the transistor pair, reactor 43, capacitor 44 and the inverter control circuit 20. When the reference signal from transformer 28 reverses in polarity, transistors 31, 32 turn off and act like an open switch while transistors 33, 34 turn on and close a circuit from terminal 41 to center tap 42 of transformer 39 by way of the aforementioned components 43, 44 and 20, whereby the voltage of transformer 39 is applied to these components with inverted polarity. In effect, the transistor pairs act like switches, pair 31, 32 being closed and pair 33, 34 being open during the positive half-cycle 45 (FIG. 2) of the square wave output from transformer 28, and pair 33, 34 being closed and pair 31, 32 being open during the negative half-cycle 46 of the square wave output from the transformer.

The transistor circuit used in the synchronizing circuit is a well-known type of AC switch wherein the respective pairs of transistors turn on or off alternately according to the polarity of the base currents when these currents are at saturation levels. By connecting each pair of transistors emitter-to-emitter the collector to emitter voltage drop across one transistor is the opposite in polarity to the collector to emitter voltage drop across the other transistor and, as a result, the voltage drop across the pair is in effect zero. Hence switching is possible without voltage drops in the switches, and errors resulting from these drops are minimized. This switch has been found to operate very well. The output from the transistor switching circuit is filtered by reactor 43 and capacitor 44 so that a steady state signal is applied to the inverter control circuit.

It can be seen from FIG. 6 that if the two systems are in phase, the voltage vectors $V_{\phi1'-N}$ and $V_{\phi2-\phi3}$ are 90° apart with respect to each other. Under these conditions the input signal or voltage at the secondary of transformer 39 is being switched at the 90° points and hence it can be seen that the average voltage out at the filter, $V_{b-c}$, is zero as shown in FIG. 3.

Now assume that the inverter has moved behind the utilities by 45° as shown in FIG. 7. FIG. 4 shows that the switching has moved behind the 90° point so that there is now an average negative DC voltage produced at the output of the filter.

If the inverter moves ahead of the utilities the switching will move ahead of the 90° point so that there is now an average positive DC voltage produced at the output of the filter as shown in FIGS. 5 and 8.

FIG. 9 shows the relationship between phase position and the error voltage and it can be seen to be a cosine function. If this DC error signal is fed into the inverter master oscillator in the proper sense, the inverter will self correct for angle errors between its output and the incoming utilities. The circuit therefore synchronizes the inverter to the utilities by discriminating between phase angle errors.

This synchronizing circuit will operate equally well using PNP transistors in the place of NPN transistors. The PNP transistors will be connected emitter to emitter as is done in FIG. 1 with the NPN transistors.

While I have shown and described particular embodiments of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. In combination:
    a. a set of electric power feeder lines adapted to be connected to a predetermined source of alternating voltage;
    b. a set of electric power load lines;
    c. an inverter having a DC input side and an AC output side, said output side being normally connected to said load lines to supply the same with alternating voltage;
    d. means for interconnecting said feeder lines and the input side of said inverter;
    e. means associated with said inverter for controlling the frequency of the alternating voltage which is thereby supplied to said load lines;
    f. a synchronizing circuit coupled to both of said sets of lines for producing an error signal whose magnitude and polarity depend on the deviation in phase of the voltage supplied by said inverter from the voltage supplied by said predetermined source; and
    g. means for applying said error signal to said control means which consequently corrects the inverter frequency so as to minimize any phase deviation between said voltages.

2. The combination of claim 1 wherein said synchronizing circuit comprises: filtering means having input and output terminals; means coupled to a predetermined one of said sets of lines for deriving an input signal representing the alternating voltage on those lines; AC switch means for applying said input signal to the input terminals of said filtering means during periodic intervals when said switch means is "on"; and means energized by the alternating voltage on the other set of lines for deriving therefrom a representative reference signal and for gating said switch means "on" during alternate half-cycles of said reference signal; said signal deriving means being so connected and arranged that said input and reference signals are apart in phase by approximately 90 electrical degrees whenever there is no phase deviation between said voltages; said error signal being the average voltage produced at the output terminals of said filtering means.

3. The combination of claim 2 wherein said filtering means is a capacitance-reactance network.

4. The combination of claim 2 wherein said predetermined one set of lines comprises said feeder lines and said other set comprises said load lines.

5. The combination of claim 2 wherein said AC switch means comprises a first bidirectional transistor switching circuit arranged to apply the input signal directly to said filtering means and a second bidirectional transistor switching circuit arranged to apply the input signal with inverted polarity to said filtering means; and wherein said gating means is arranged to gate the transistors in said first circuit "on" and those in said second circuit "off" during each positive half-cycle of said reference signal and to gate the transistors in said second circuit "on" and those in said first circuit "off" during each negative half-cycle of said reference signal.

6. The combination of claim 5 wherein said input signal deriving means comprises a transformer having a primary connected to said feeder lines and a center tapped secondary, said first and second switching circuits being respectively connected between a common input terminal of said filtering means and opposite ends of said secondary, and another input terminal of said filtering means being directly connected to said center tap.

7. The combination of claim 5 wherein said reference signal is a substantially square wave alternating voltage of constant amplitude comprising positive and negative gating pulses for said first and second switching circuits respectively.

8. The combination of claim 7 wherein said gating means comprises a transformer having a primary energized by said reference signal and having two secondaries, one for each switching circuit of the AC switch means connected in the circuit for gating the transistors.